E. SCHATTNER.
MEASURING INSTRUMENT.
APPLICATION FILED AUG. 23, 1907.
912,181.
Patented Feb. 9, 1909.
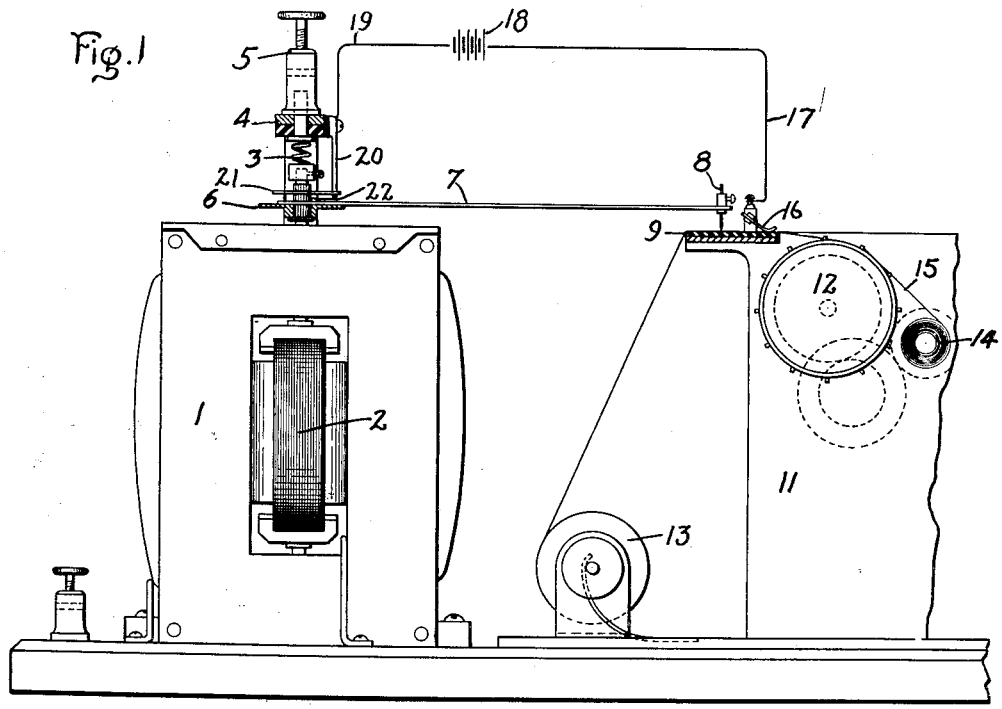
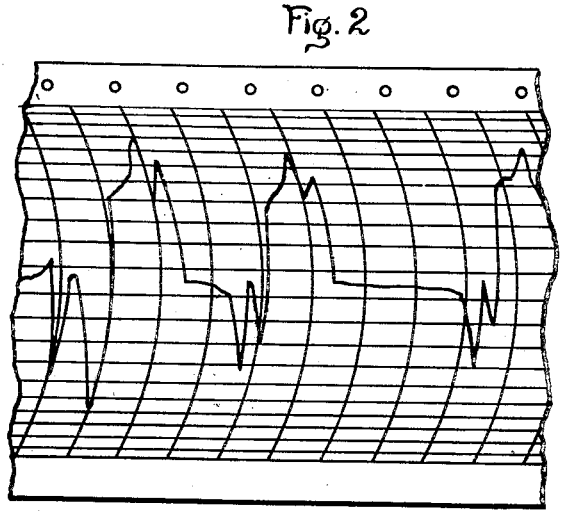
WITNESSES:
INVENTOR
ERNEST SCHATTNER.
BY
ATT'Y.

UNITED STATES PATENT OFFICE.

ERNEST SCHATTNER, OF EALING, ENGLAND, ASSIGNOR TO GENERAL ELECTRIC COMPANY, A CORPORATION OF NEW YORK.

MEASURING INSTRUMENT.

No. 912,181.

Specification of Letters Patent.

Patented Feb. 9, 1909.

Application filed August 23, 1907. Serial No. 389,812.

*To all whom it may concern:*

Be it known that I, ERNEST SCHATTNER, a subject of the King of Great Britain, residing at Ealing, England, have invented certain new and useful Improvements in Measuring Instruments, of which the following is a specification.

This invention relates to measuring instruments and more particularly to instruments for making a record of the quantities measured.

In many kinds of measuring instruments, particularly electrical instruments, the forces available to move the pointer are small, hence the moving parts must be as light as possible and the pointer must move over the record sheet with a minimum amount of friction, since any friction between the pointer and the record sheet seriously impairs the accuracy of the instrument and injures increased operating power. Many recording instruments make a mark on a record sheet by means of a pen, which is made as small and light as possible, with the result that the pen requires cleaning and re-filling at frequent intervals.

The object of my invention is to provide a recording instrument which produces a clear and legible record, which reduces friction between the pointer of the instrument and the record sheet to a minimum, which eliminates the necessity of cleaning and filling a pen or similar device, and a further object is to improve in general the construction and operation of recording instruments.

In carrying out my invention I provide a record sheet with a coating thereon differing in appearance from the sheet upon which it is spread, and easily affected by heat, and arrange the device so that as the pointer of the instrument moves over the record sheet in response to the variations of energy to be measured, the coating is heated and thereby removed from that portion of the record sheet immediately beneath the end of the pointer, whereby a mark or line, due to the difference in appearance of the coating and the record sheet, is left as a record of the movement of the pointer. The record sheet may be of any suitable material and the coating may be of any substance which is removed or melted by heat. In the preferred arrangement the record sheet is made of paper or other insulating material coated with a thin film of metal foil and known as silver paper. This record sheet is mounted on suitable mechanism for moving it at a uniform rate and is so arranged that the metal film is maintained in contact with a metallic pointer or electrode moving at right-angles to the direction of travel of the record sheet in response to the variations of energy. A source of electricity is connected to the pointer or electrode and also to the metallic film of the record sheet, so that when the electrode makes contact with the film a current of electricity flows and generates enough heat at the point of contact to melt the metal film whereupon the metal immediately adjacent the electrode disappears and the circuit through the electrode is broken or a small one is formed which increases the resistance of said circuit. The current to be measured maintains a constant torque on the electrode and drives it forward against a fresh metallic surface, thus the indicator arm has a comparatively free movement, as the metal wall is constantly burned away and the indicator can take the full range of deflection determined by the current to be measured unimpeded by any lag due to friction. As the electrode moves back and forth over the record sheet the metallic film is melted in a line which is a true record of the movement of the electrode and which is easily visible on account of the difference in appearance between the metallic film and the record sheet immediately beneath it.

My invention will best be understood in connection with the accompanying drawings which are merely an illustration of one embodiment of my invention and in which—

Figure 1 shows an electrical recording measuring instrument constructed in accordance with my invention; Fig. 2 a view of a record sheet with record made thereon; and Fig. 3 a sectional view of the record sheet showing the insulating base with the metallic film secured thereto.

In the arrangement shown in Fig. 1, the electrical measuring instrument may be of any well known type and as shown comprises the usual field magnet 1 and moving coil 2 pivotally mounted adjacent the field magnet and held in normal position by a helical spring 3 having one end attached to the spindle on which the coil is mounted and the other end rigidly secured to a support or frame-work 4. When no current is flowing the spring 3 holds the coil 2 in its zero position, but when current flows the coil turns against the tension of the spring 3 a distance depending upon the amount of current. The current is led to the moving coil 2 through the spring 3 from a binding-post 5 mounted upon the frame or support 4. The spindle on which the coil 2 is mounted also carries a collar 6 to which is secured a pointer or arm 7 the free end of which carries a member or electrode 8 which is moved back and forth through an arc of a circle by the coil 2. Any other type of measuring instrument could be substituted for that shown in Fig. 1 as long as a metallic member or electrode 8 is moved over a record sheet by the instrument.

To obtain a record of the movements of the pointer or electrode 8 a support or plate 9, preferably of insulating material, is mounted adjacent the electrode and parallel to its path of movement so that the electrode 8 swings back and forth over the plate 9 but out of engagement therewith. The record sheet is fed between the electrode 8 and the plate 9 mounted upon a shelf 10 forming a part of the frame-work 11 by a feeding mechanism of any suitable sort, shown in the drawings as a feeding cylinder 12 mounted in the frame-work 11 and driven in any suitable manner by clockwork or other suitable actuating mechanism to shift the record sheet from a roller 13 over the plate 9 to a roller 14 by means of projections on the feeding roller 12 which engage perforations in the record sheet 15. As shown in Fig. 3, the preferred form of record sheet consists of a base 15$^a$ carrying a metal coating 15$^b$ preferably of low melting point and differing in appearance from the base 15$^a$ so that if by any means the coating 15$^b$ is removed the contrast in appearance between the coating and the base exposed by the removal of the coating will be noticeable. In the preferred form of record sheet the base 15$^a$ consists of paper or other insulating material, while the coating 15$^b$ is a thin film of metal foil, lead, tin, silver or other fusible or heat sensitive conducting material The movable member or electrode 8 controls the application of heat to the coating on the record sheet in any suitable manner, but preferably the heat is generated by a current of electricity flowing through the electrode and coating. The preferred arrangement for securing the flow of current comprises a brush 16 of large surface relatively to the electrode arranged to engage the conducting surface of the record sheet 15 as the sheet is moved over the plate 9 by the feeding mechanism and connected through a lead 17 to a battery or other source of electric current 18. The source of current is also connected to a lead 19 through a conducting finger 20 carried on the frame 4 and having one end connected through a connection 21 with a conducting collar 22 mounted on the spindle of the moving coil 2 and forming an electrical connection between the connection 21 and the arm 7 which carries the metallic member or electrode 8. With this arrangement therefor a circuit is completed from the battery 18, through the arm 7 and electrode 8, thence through the metallic film of the record sheet to the brush 16 and back to the battery 18. The circuit is so adjusted that the flow of current is sufficiently great to melt instantly the thin film of metal immediately beneath the pointer or electrode 8. As soon as the film is melted the molten metal is either absorbed by the record sheet or else separates and adheres to the film on each side of the electrode, thereby removing all metal from beneath the electrode 8 and breaking the circuit. As the electrode 8 moves back and forth over the record sheet 15 at right-angles to the direction of movement of said sheet, a line is traced by the melting of the film beneath the point of the electrode and this line is clearly visible on account of the marked difference in appearance between the record sheet and the metallic film. The friction between the electrode 8 and the record sheet is reduced to a minimum since all that is necessary is that the electrode 8 be close enough to the metallic film to complete the circuit when the film immediately beneath the electrode is unbroken, and this result may be obtained with a very light or even zero pressure of the electrode on the film, while the removal of the film as fast as the electrode moves over it removes most of the resistance to the movement of the electrode, so that the instrument is free from the errors caused by the pressure of a pointer on a recording surface.

My invention may be embodied in many other forms than that shown and described, and I therefore do not wish to be restricted to the precise form shown, but intend to cover by the appended claims all changes and modifications within the spirit and scope of my invention.

What I claim as new and desire to secure by Letters Patent of the United States, is,—

1. In a recording instrument, the combination with feeding means for a record sheet having a coating different from the sheet and removable therefrom by heat, of a member movable over the coating of said record sheet in response to variations of current, and means for heating the coating between said member and the record sheet.

2. In a recording instrument, the combination with a member movable in response to variations of the quantity to be measured, of means for causing a record sheet which is changed in appearance by heat to travel in contact with said member, and means for heating only that part of said record sheet which is in contact with said member.

3. In a recording instrument, the combination with a record sheet having a fusible coating, of a pointer movable over said record sheet in response to variations of the quantity to be measured and means for fusing said coating between said pointer and said record sheet.

4. In a recording instrument, the combination with an electrode and means for moving said electrode in response to variations of current, of means for moving a record sheet having a fusible conducting coating in contact with said electrode, and a source of heating current connected to the electrode and to the record sheet.

5. In combination with an electrode and means for moving said electrode in response to variations of current, of means for causing an insulating record strip with a fusible conducting film to travel with said film in contact with the electrode, and a source of current having one pole in electrical connection with said electrode and the other pole with said film.

6. The combination with an electrode and means for moving said electrode in response to variations of current, of means for causing an insulating record strip with a fusible conducting film to travel with said film in contact with the electrode, a brush in engagement with said film and a source of current connected to said electrode and to said brush.

7. The combination with an insulating record sheet having a thin film of fusible metal thereon, of an electrode arranged to move in response to variations of current over the film in contact therewith, and means for connecting the electrode and the film in circuit with a source of current.

In witness whereof, I have hereunto set my hand this ninth day of August, 1907.

ERNEST SCHATTNER.

Witnesses:
  F. J. SKOYLES,
  A. NUTTING.